E. GRUMMAN.
Bee Hive.
No. 2,645.
Patented May 26, 1842.
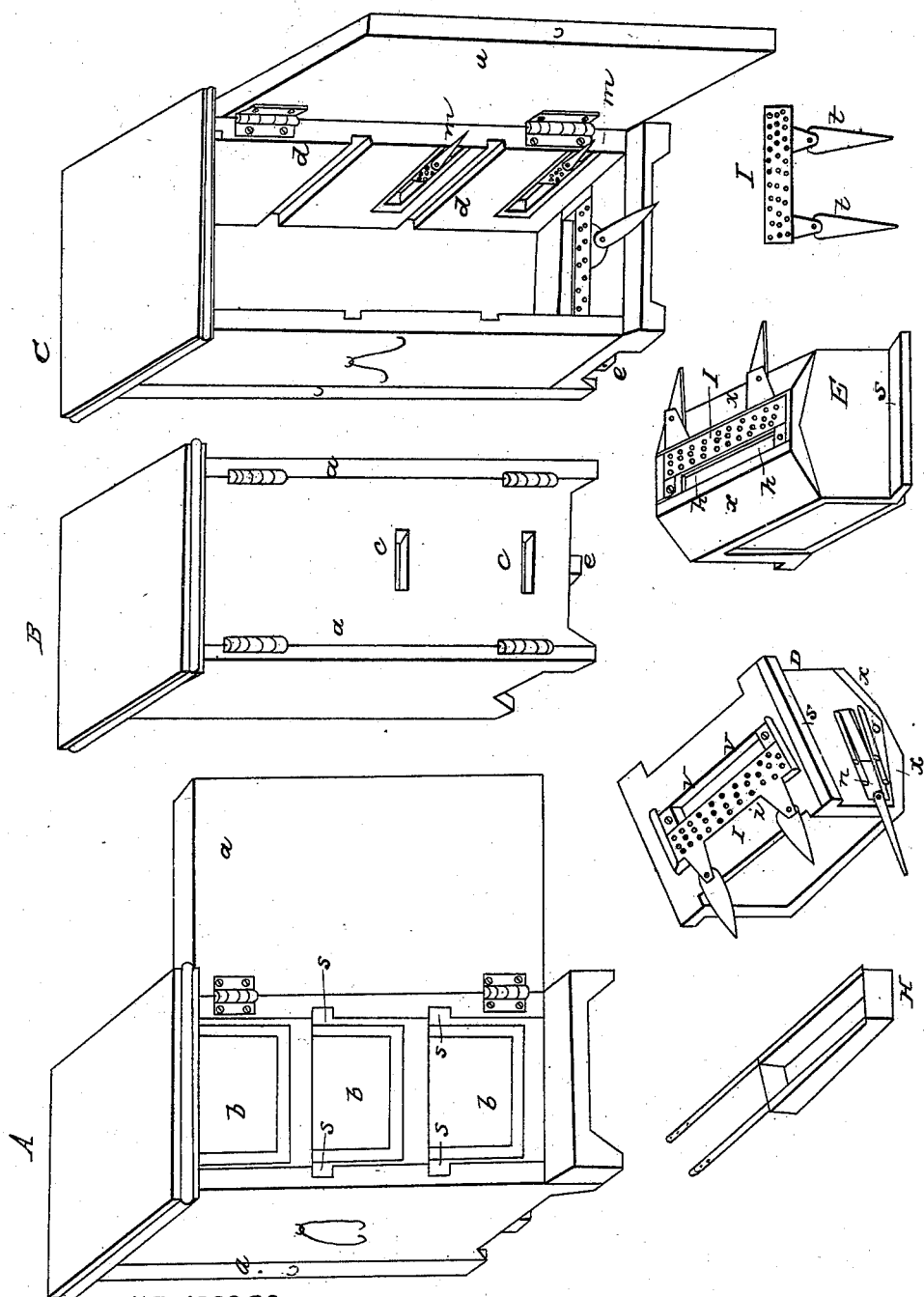
WITNESSES
INVENTOR

UNITED STATES PATENT OFFICE.

ELIJAH GRUMMAN, OF NORWALK, CONNECTICUT.

BEEHIVE.

Specification of Letters Patent No. 2,645, dated May 26, 1842.

*To all whom it may concern:*

Be it known that I, ELIJAH GRUMMAN, of Norwalk, in the county of Fairfield and State of Connecticut, have invented a new and useful Improvement in the Mode of Constructing Beehives, and that the following is a full and exact description thereof, reference being had herein to the drawings of said beehive, which accompany this specification.

My hive is constructed of wood, of any desirable size, with two doors (*a, a*, Figures B, C, and A,) on opposite sides thereof of the same height and width with the hive. In one side of this hive are holes (Fig. B, *c, c*,) for the entrance of the bees into the boxes hereinafter described. On the inside of the hive are placed tin slides with jointed handles (as in C, *m, m*,) moving in tin grooves by means of which these holes may be closed at pleasure. In this hive boxes (constructed as hereinafter described and marked in the drawing D, and E,) are placed one above another (the number of boxes depending upon the size of the hive), which slide, by means of a lip (*s, s*, in Figs. A, D, and E,) attached to the upper part of the sides of each box, into grooves (*d, d*, Fig. C,) made in the inner sides of the hive. These boxes are made of wood—the two sides next the two doors consisting each of a pane of glass of a size corresponding with the size of the box. There is a hole (*o*, Fig. D,) in one side of each box to correspond with the holes in the side of the hive. Over this hole a tin slide with jointed handle (*n*, Fig. D,) is fitted in the same manner as the slides upon the sides of the hive. The top of each box is level, with an opening (*v*, Fig. D,) in the top of about three-quarters of an inch in width running entirely across the top of the box in the center from right to left. The bottom of the box consists of two inclined planes (*x, x*, Figs. D, and E,) sloping downward toward the center of the bottom of the box, with an opening (*h, h*, Fig. E,) between them corresponding with the opening in the top of the box. Over each of these openings are placed tin slides (constructed as in Fig. I, in drawing) perforated with small holes to admit the air when the slides are closed, moving in tin grooves. By means of these slides the communication between the boxes may be cut off at pleasure, and jointed handles are attached to them, that the handles may be turned in and not interfere with the shutting of the doors of the hive. Attached to the bottom of the hive and placed directly beneath an opening in the bottom of the hive corresponding in direction, length, and width with the openings in the tops and bottoms of the boxes, is an oblong box (Fig. H,) of a size adapted to that of the opening, and from three to four inches in depth. This box is to be partly filled with ashes and is designed to catch the worms which fall off from the inclined planes in the boxes above and destroy them. This is so fitted to the bottom of the hive as to be removed at pleasure. When the boxes are all placed in their proper position in the hive (as in Fig. A,) the opening in the bottom of the upper box matches the opening in the top of the adjacent box beneath, and thus, when the slides are all withdrawn, an uninterrupted communication exists between the top box and the ash-box or worm-trap below. When it is desired to remove a box that is filled with honey, the slide at the bottom of the box to be removed and the slide at the top of the box next below is to be pushed in. By this operation the bees are confined to the boxes below and the small portion of the comb which fills the opening between the two boxes is cut off, and the upper box may be taken out. The box when emptied should be placed in the bottom of the hive, the other boxes being placed a story higher for that purpose, in the same order in which they stand.

What I claim as my own invention and not previously known in the above described hive is,

The combination of several boxes of the form above specified, supported as above described, with the ash-box or trap as above described, for the purposes which are referred to in the specification.

The advantages of the construction of my hive over all others heretofore known or used are apparent from this description of it.

ELIJAH GRUMMAN.

Witnesses:
 JOHN A. WEED,
 TIMO. T. MERWIN.